May 22, 1951        R. L. STEVEN        2,553,878

HEATER FOR CANNED FOOD CONTAINERS

Filed Aug. 23, 1946        2 Sheets-Sheet 1

INVENTOR.
RAY L. STEVEN.
BY
Hebner, Maltby & Beehler
ATTORNEYS.

May 22, 1951 R. L. STEVEN 2,553,878
HEATER FOR CANNED FOOD CONTAINERS
Filed Aug. 23, 1946 2 Sheets-Sheet 2
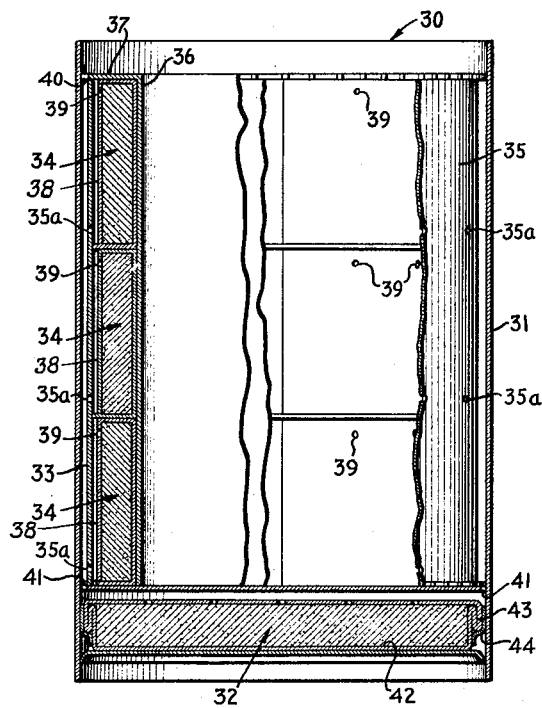
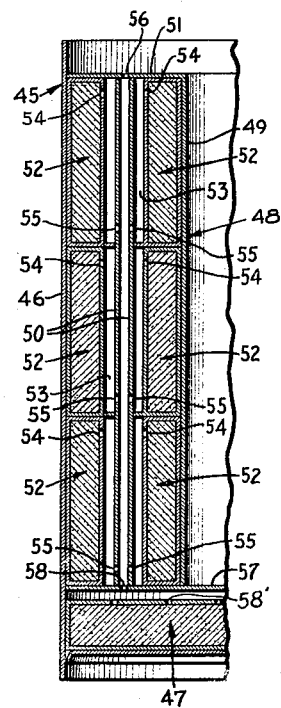
INVENTOR.
RAY L. STEVEN.
BY
ATTORNEYS.

Patented May 22, 1951

2,553,878

UNITED STATES PATENT OFFICE 2,553,878

HEATER FOR CANNED FOOD CONTAINERS

Ray L. Steven, Los Angeles, Calif.

Application August 23, 1946, Serial No. 692,625

3 Claims. (Cl. 126—263)

This invention relates to heated food products and containers and more especially to a device for heating packaged foods, such as canned food products.

An object of the invention is to provide a simple, practical and inexpensive article adapted for heating food product cans and the like.

Another object of the invention is to provide an improved article adapted to receive a food can or similar article which will become exothermic upon the addition of water, whereby the can or other article is heated.

An additional object of the invention is to provide an exothermic article for heating canned food products and also other food products, such as tamales, frankfurters, and other items of like character.

An additional object of the invention is to provide a novel exothermic article of the character described adapted to replaceably receive a plurality of cartridges containing the material which becomes exothermic upon the addition of water.

Other objects and advantages will appear and be brought out more fully in the following specification considered with reference to the accompanying drawings throughout which like parts are designated by like numerals.

In the drawings:

Figure 4 is a view similar to Figure 2 showing a modified form of my invention.

Figure 5 is a fragmentary view similar to Figure 4 showing a further modified form of my invention.

Figure 1:
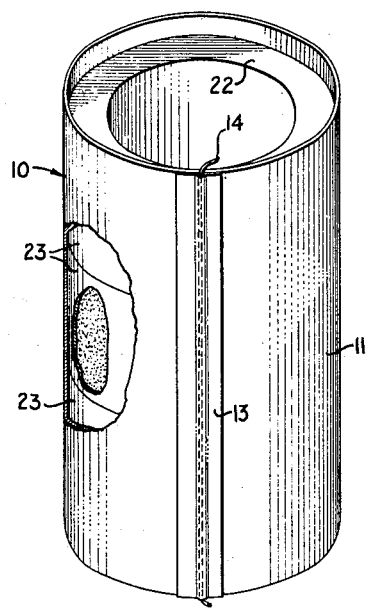
Figure 1 is a perspective view of a heated food container embodying a form of my invention.
Figure 3:
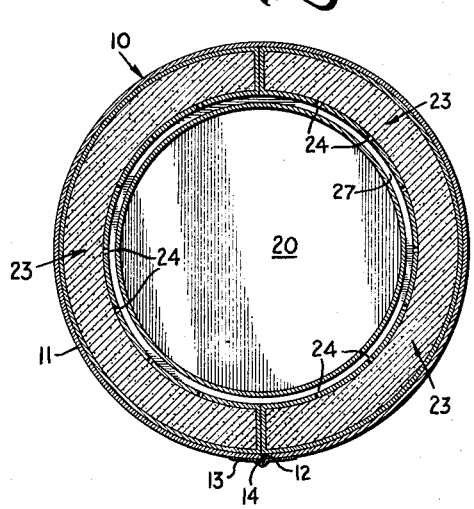
Figure 3 is a sectional view taken along the line 3—3 of Figure 2.
Figure 2:
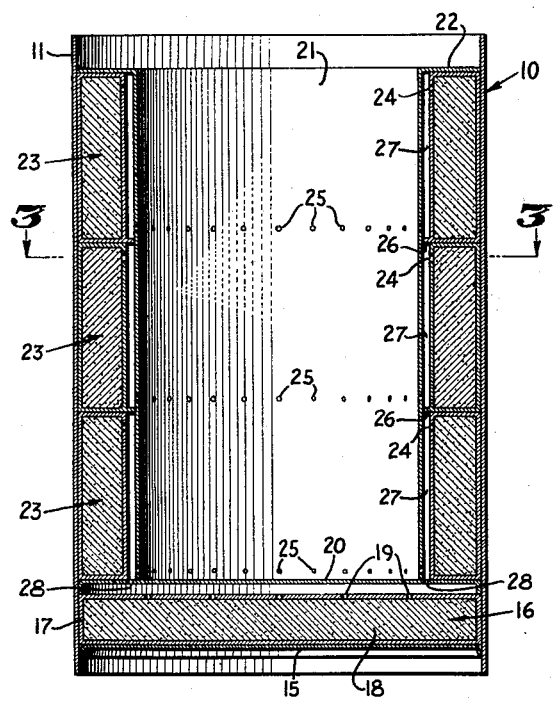
Figure 2 is an elevation view in section of the same.

Referring more particularly to the drawings and especially to Figures 1 to 3, I show exothermic food products container 10 comprising a cylindrical shell 11 of any suitable material, such as paperboard, cardboard, or the like, the shell being split and having meeting edges 12 adapted to be held together as by sealing strip 13 of adhesive material, there being a string or cord 14 held by strip 13 along edges 12, whereby the sealing strip may be ripped to permit separation of edges 12 for the replacement of the exothermic cartridges, as will be more fully apparent hereinafter.

The shell secures a bottom piece 15 adapted to support an exothermic cartridge 16 comprised of suitable wrapper 17 enclosing a quantity of lime 18 or other chemical material which becomes exothermic upon the addition thereto of water, cartridge 16 having a plurality of apertures 19 in the upper portion thereof through which the water may enter to the chemical 18.

A supporting disc 20 is suitably positioned over cartridge 16 and supports a tubular member 21 having an outwardly extending upper flanged portion 22 which extends to the wall of cylinder 11. A plurality of semi-circular cartridge elements 23 are disposed between tubular member 21 and cylinder 11 and supported one above the other on disc 20. Cartridges 23 each have a plurality of fluid openings 24 adjacent the upper portion thereof and tubular member 21 has a similar plurality of openings 25 adjacent the lower portions of cartridges 23, there being suitable rings 26 disposed between tubular member 21 and cartridges 23, whereby to provide fluid passage 27 therebetween directed upwardly from openings 25 to openings 24. Disc 20 has openings 28 below the lower passage 27 to permit fluid flow into the space below the disc and into openings 19 of cartridge 16.

The operation of the invention as thus far described should be apparent from the foregoing description. A food article, such as a can, may be placed within tubular member 21 and water may be poured on the can or on flange 22, whereupon the water will be directed downwardly within tubular member 21 and through openings 25 into passages 27 and upwardly therein through openings 24 into cartridges 23 and downwardly through openings 28 into cartridge 16. The cartridges thereupon become exothermic and provide heat for heating the can within the tubular member. Cartridges 16 and 23, upon the addition of water thereto in the manner indicated swell up and expand a considerable amount and therefore the passages 27 and the space between disc 20 and rings 26 are provided. This expansion may, however, be absorbed wholly or partially by providing cartridge walls or tubular member 21 with a corrugated paper board wall construction. After use, the cylindrical shell 11 may be opened, as described hereinabove, and cartridges 16 and 23 removed and replaced with new active cartridges.

In Figure 4 I show a modified form of my invention comprising a container 30 having a shell 31, a bottom cartridge 32 and a tubular member 33 and a plurality of semi-circular cartridges 34 similar to cartridges 16 and 23 respectively. Tubular member 33 has wall portions 35 and 36, between which cartridges 34 are positioned, and an upper cross-wall 37 similar to flange 22. Wall portion 35 has openings 35a therein and is spaced from the adjacent wall of cartridges 34 and from shell 31, there being annular spaces 38 between wall 35 and cartridges 34, the latter having openings 39. Top wall 37 has a plurality of notches or openings 40, whereby water poured into the top of the container 30 will course downwardly between shell 31 and wall 35 and upwardly adjacent the cartridges 34 and into the same through openings 39.

An opening 41 in the bottom disc permits water to pass into cartridge 32 in the same manner as cartridge 16. Cartridge 32 has an expansible walled wrapper 42 formed with a pleat 43 in the side edge portion thereof, which pleat may be covered by adhesive strip 44 which will fracture or separate upon expansion of the chemical material in the cartridge when water is added.

In Figure 5 I show a further modified form of the invention comprising a container 45 having a shell 46, a lower chemical cartridge 47 and a tubular unit 48 which combines the features of tubular members 21 and 33. Tubular member 48 has an inner wall 49, a pair of spaced walls 50 and a top flange 51. A plurality of semi-circular cartridges 52 are disposed between shell 46 and wall 49 in spaced relation on opposite sides of walls 50. Annular spaces 53 are disposed between cartridges 52 and walls 50. Openings 54 and 55 are provided for the cartridges and the walls 50. Flange 51 is formed with a plurality of openings 56 and the lower disc 57 is formed with a plurality of openings 58, these openings being disposed above and below the space between walls 50. It should be clear that water poured into container 45 will course downwardly between walls 50 passing through openings 56, 55 and 58, and then pass to cartridges 52 and 47 through openings 54 and 58' respectively.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices and systems.

Having thus described my invention, what I claim and desire to secure by Letters Patent is:

1. A heater for canned food containers comprising, in combination; a cylindrical shell, a tubular member within and spaced from said shell and having a lateral annular flange at the top thereof, and a plurality of annular chemical cartridges having walls and disposed one above the other within said shell and spaced from said tubular member and having fluid openings in the inner wall thereof adjacent the top thereof, said tubular member having a plurality of fluid openings adjacent the lower portion of each cartridge whereby to admit water poured on said flange which courses down the inner wall of said tubular member to said cartridges, the space between said cartridges and tubular member forming upwardly directed fluid passages from said tubular member openings to said cartridge wall openings.

2. A heater for canned food containers comprising, in combination; a cylindrical shell, a tubular member within and spaced from said shell and having a lateral annular flange at the top thereof, a disc below said tubular member having fluid openings and a plurality of annular chemical cartridges having walls and disposed one above the other within said shell and spaced from said tubular member and having fluid openings in the inner wall thereof adjacent the top thereof, a flat cartridge below said disc and spaced therefrom, said tubular member having a plurality of fluid openings adjacent the lower portion of each cartridge whereby to admit water poured on said flange which courses down the inner wall of said tubular member to said cartridges, the space between said cartridges and tubular member forming upwardly directed fluid passages from said tubular member openings to said cartridge wall openings.

3. A heater for canned food containers comprising, in combination; a cylindrical shell, a tubular member within and spaced from said shell and having a lateral annular flange at the top thereof, and a plurality of annular chemical cartridges within said shell and spaced from said tubular member, said cartridges and tubular member each having a plurality of fluid openings whereby to admit water poured on said flange which courses down the inner wall of said tubular member to said cartridges, said shell having a separable wall portion adapted to permit replacing said cartridges.

RAY L. STEVEN.

REFERENCES CITED

The following references are of record in the file of this patent:

UNITED STATES PATENTS

| Number | Name | Date |
|---|---|---|
| 794,848 | Bohm | July 18, 1905 |
| 862,151 | Friedman et al. | Aug. 6, 1907 |
| 1,088,926 | Radlein et al. | Mar. 3, 1914 |
| 1,838,357 | Bottrill | Dec. 29, 1931 |
| 2,265,172 | Katz | Dec. 9, 1941 |
| 2,300,793 | Martin | Nov. 3, 1942 |
| 2,373,611 | Steven | Apr. 10, 1945 |
| 2,384,700 | Babcock et al. | Sept. 11, 1945 |

FOREIGN PATENTS

| Number | Country | Date |
|---|---|---|
| 329,082 | Germany | Nov. 15, 1920 |